(No Model.)
J. SCHÜLKE.
GAS LAMP.
No. 275,528. Patented Apr. 10, 1883.
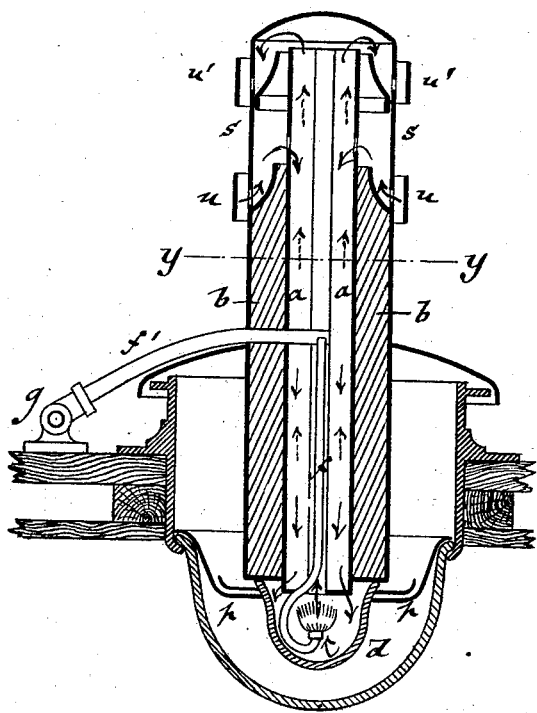
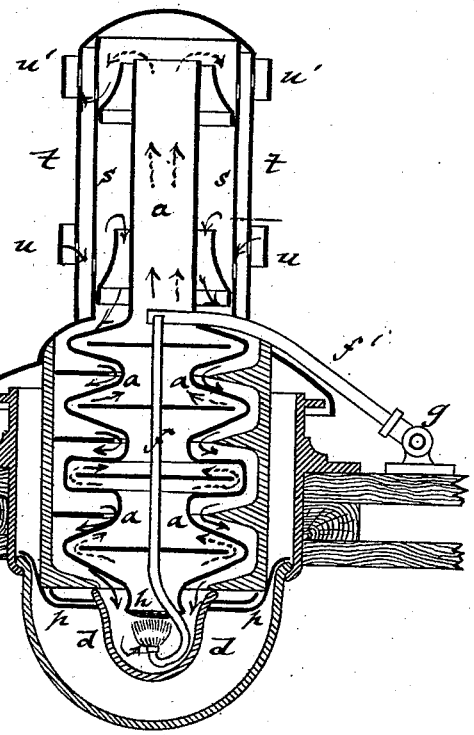
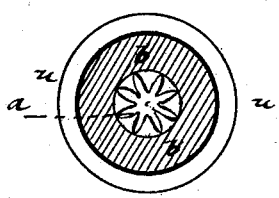
WITNESSES:
INVENTOR
Julius Schülke
BY Paul Goepel
ATTORNEY

UNITED STATES PATENT OFFICE.

JULIUS SCHÜLKE, OF BERLIN, GERMANY.

GAS-LAMP.

SPECIFICATION forming part of Letters Patent No. 275,528, dated April 10, 1883.

Application filed November 29, 1882. (No model.)

*To all whom it may concern:*

Be it known that I, JULIUS SCHÜLKE, of Berlin, in the Kingdom of Prussia and Empire of Germany, have invented certain new and useful Improvements in Gas-Lamps, of which the following is a specification.

This invention has reference to an improved construction of gas-lamps for railway-cars and other purposes, in which both the illuminating-gas and the air required for the combustion of the gas are heated up in their passage to the flame of the burner; and the invention consists of a gas-lamp in which the air is drawn in and heated up in its passage to the flame by being conducted through a circuitous channel formed by an interior corrugated tube and an exterior inclosing-tube formed of a suitable non-conductor of heat, while the gases of combustion are conducted off through the interior of the corrugated tube and through a chimney to the outside. The lower part of the lamp is provided with a hermetically-closed glass globe, a reflector encircling the same, and a second exterior glass globe. Immediately above the flame is arranged an incombustible body, which is heated to incandescence while permitting the passage of the gases of combustion, so as to increase the illuminating power of the flame.

In the accompanying drawings, Figures 1 and 2 represent vertical central sections of two modified constructions of my improved gas-lamp; and Fig. 3 is a vertical transverse section on line *y y*, Fig. 1.

Similar letters of reference indicate corresponding parts.

The mechanism for heating up the atmospheric air in its passage to the flame is accomplished by the gases of combustion, and consists of a tube, *a*, having a number of longitudinal corrugations, as shown in cross-section in Fig. 3, in which figure the tube *a* appears in the form of a star. This tube *a* is inclosed by a surrounding tube, *b*, which is made of a suitable non-conductor of heat. A glass globe, *d*, is arranged at the lower part of the tubes *a b*, by which the flame is hermetically inclosed, so that the air necessary for combustion can only pass to the interior of the glass globe *d* by entering through the perforations at the upper part of the tube *a*. The air is then drawn down to the flame through the longitudinal channels between the tube *a* and the inclosing-tube *b*. The products of combustion can only pass off through the inside of the star-shaped tube *a*, the rolls of which are heated up thereby and adapted to raise the temperature of the air drawn in during its passage through the spaces between the tubes *a* and *b*. The course of the air is indicated by full-line arrows in Figs. 1 and 2, while the course of the products of combustion is indicated by dotted arrows. The products of combustion pass off at the upper end of the tube *a*, and are conducted to the outside through openings of the chimney *s*, which is closed at the top. The illuminating-gas is conducted to the flame by a gas-pipe, *f*, which extends centrally downward through the tube *a*, and which is bent at its lower end in such a manner that the flame heats up the vertical portion of the gas-pipe, and consequently the gas conducted through the same to the flame. The vertical portion of the gas-pipe is connected at its upper end to a gas-arm, *f'*, which passes through the tubes *a* and *b* to the outside, and which is hinged by a joint at *g* to the supply-pipe, so that the lamp can be swung into open position for lighting and cleaning, which feature, however, is well known, and has been used heretofore.

A modified construction of the gas-lamp is shown in Fig. 2, in which, in place of the longitudinally-corrugated tube *a*, a tube with horizontal corrugation is used, whereby alternately enlarged and contracted portions are formed. The air is drawn into the space between the corrugated interior tube, *a*, and the inclosing-jacket *b*, made of a non-conductor of heat, the latter being provided with projections or annular diaphragms at the contracted portions of the tube *a*, so as to render thereby the course of the air more circuitous in its passage to the flame. At the interior of the tube *a* diaphragms of less diameter than that of the enlarged portions are arranged, whereby the products of combustion are compelled to pass in a circuitous course around the same, as indicated by arrows. The gas-conducting pipe *f* is arranged centrally in the tube *a* and connected to a hinged gas-arm, *f'*, in the same manner as in Fig. 1. The chimney *s* is surrounded by a second larger chimney, *t*, both being provided with openings at the lower part for the admission of air, and openings at the upper part for the escape of the gases of combustion. The openings of the chimneys $s$ and $t$ are protected against the influence of the wind by rings $u$ and $u'$. Above the flame is arranged, at the lower end of the corrugated tube $a$, an incombustible body, $h$, preferably of lens shape, which is adapted to admit the passage of the products of combustion, and to be heated to incandescence by the flame. This body may be made of platinum wire, asbestus, chalk, or other suitable material. The glass globe $d$, which incloses the flame, is surrounded by a ring-shaped reflector, $p$, which is again inclosed by a larger glass globe, $d'$, below the globe $d$, the latter, like the reflector, being supported on the exterior lamp-casing by which the lamp is suspended in the ceiling of the car or other structure.

Practical tests have shown that the air is heated up to a considerable degree of heat on its passage to the flame and there mixed with the heated-up gas, so that with an equal quantity of gas a considerably increased light-power is obtained than with the common appliances. A clear white flame is produced, the light-giving power of which is considerably increased by the incandescent body above the same.

Having thus described my invention, I claim as new and desire to secure by Letters Patent—

1. In a gas-lamp, a chimney with a closed top and having a circumferential row of openings for the admission of air and a circumferential row of openings for the exit of gases, a combustion-tube with horizontal corrugations, a jacket of non-conducting material provided with annular diaphragms, a hermetically-closed glass globe below the burner, a reflector encircling the same, and a second exterior glass globe, substantially as described.

2. The combination, with an interior corrugated tube, $a$, and an exterior surrounding tube, $b$, made of a suitable non-conductor of heat, and adapted to form, with the inner tube, exterior and interior passages, respectively, for the air and the products of combustion, of a chimney, $s$, an exterior chimney, $t$, both having perforations, respectively, for the entrance of the air and the exit of the gases of combustion, and with encircling protecting-rings $u$ $u'$, substantially as set forth.

3. The combination, with an interior corrugated tube, $a$, exterior surrounding tube $b$, made of a suitable non-conductor of heat, central gas-pipe, $f$, bent at its lower end, an incandescent body, $h$, located above the flame, and globe $d$, closing the lower end of tubes $a$ $b$, substantially as specified.

In testimony that I claim the foregoing as my invention I have signed my name in presence of two subscribing witnesses.

JULIUS SCHÜLKE.

Witnesses:
B. ROI,
H. ZIMMERMAN.